United States Patent [19]

McClure

[11] Patent Number: 5,281,382
[45] Date of Patent: Jan. 25, 1994

[54] METHOD OF MAKING MOLDS

[76] Inventor: James B. McClure, 7810 NW Scenic Dr., Kansas City, Mo. 64152

[21] Appl. No.: 939,606

[22] Filed: Sep. 2, 1992

Related U.S. Application Data

[62] Division of Ser. No. 822,743, Jan. 21, 1992, Pat. No. 5,221,505.

[51] Int. Cl.⁵ ............................................. B29C 33/40
[52] U.S. Cl. .................................. 264/227; 249/160; 264/334
[58] Field of Search ................................. 264/31–35, 264/219–221, 225–227, 309, 317, 318, 334, 337, 338; 249/102–104, 134, 139, 160

[56] References Cited

U.S. PATENT DOCUMENTS

| | | | |
|---|---|---|---|
| 103,888 | 6/1870 | Jackson | 264/220 |
| 691,704 | 1/1902 | Kennedy | 264/225 |
| 903,189 | 11/1908 | Holstein | 264/227 |
| 946,332 | 1/1910 | Callahan | 264/225 |
| 1,224,584 | 5/1917 | Vogan | 249/104 |
| 1,292,986 | 2/1919 | Ambursen | 249/102 |
| 1,439,646 | 12/1922 | Smith | 264/31 |
| 1,865,500 | 7/1932 | Bemis | 264/34 |
| 2,286,531 | 6/1942 | Fralick | 264/35 |
| 2,472,060 | 6/1949 | Beylerian | 264/226 |
| 2,548,935 | 4/1951 | Billner | 264/31 |
| 3,689,021 | 9/1972 | Liesler | 249/134 |
| 3,772,110 | 11/1973 | Brown | 264/227 |
| 3,844,522 | 10/1974 | Cochran | 249/104 |
| 3,903,663 | 9/1975 | Bainter et al. | 52/79.1 |
| 4,029,287 | 6/1977 | Burdett | 249/27 |
| 4,037,816 | 7/1977 | Scott | 249/134 |
| 4,156,998 | 6/1979 | McClure | 52/309.5 |
| 4,290,985 | 9/1981 | Barale | 264/31 |
| 4,496,511 | 1/1985 | Virgili | 264/225 |
| 4,656,722 | 4/1987 | Armstrong | 264/227 |
| 4,687,428 | 8/1987 | Martin et al. | 425/60 |
| 4,798,364 | 1/1989 | Scott | 264/225 |
| 4,799,873 | 1/1989 | Martin | 425/73 |
| 4,889,310 | 12/1989 | Boeshart | 249/134 |
| 5,074,517 | 12/1991 | Scott | 249/134 |
| 5,098,059 | 3/1992 | Sawyer | 249/134 |

Primary Examiner—Jay H. Woo
Assistant Examiner—James P. Mackev
Attorney, Agent, or Firm—Litman, McMahon & Brown

[57] ABSTRACT

A method of making a mold assembly for molding inner and outer shells of an equipment shelter utilizes a generally rectangular frame on which are supported a plurality of large flat panels formed of plywood and covered by thin sheets of stainless steel. The panels are separated by rib gaps on the sides and corner gaps at the corners which are closed by temporary, wooden rib and corner patterns. A reinforced plastic laminate is applied to the temporary patterns to form negative molds. When cured, the negative molds are removed from the frame, along with the temporary patterns. A reinforced plastic laminate is applied to each of the negative molds and cured to form permanent rib and corner molds. The permanent molds are positioned in their respective rib and corner gaps to complete the mold assembly.

4 Claims, 3 Drawing Sheets

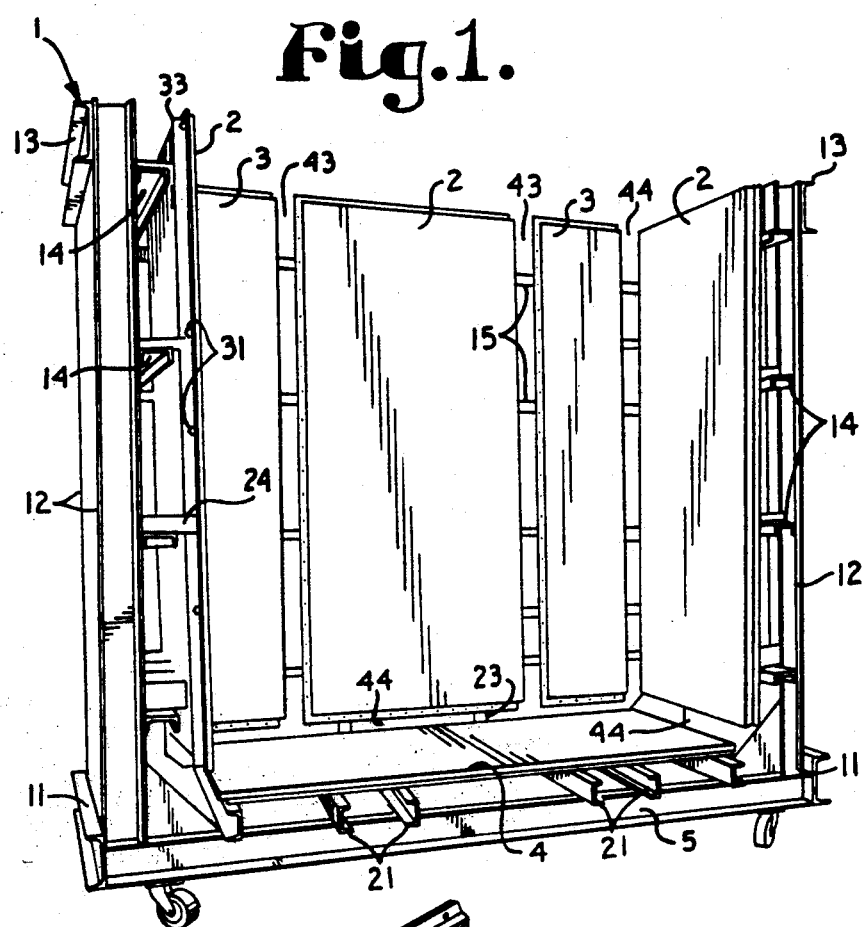
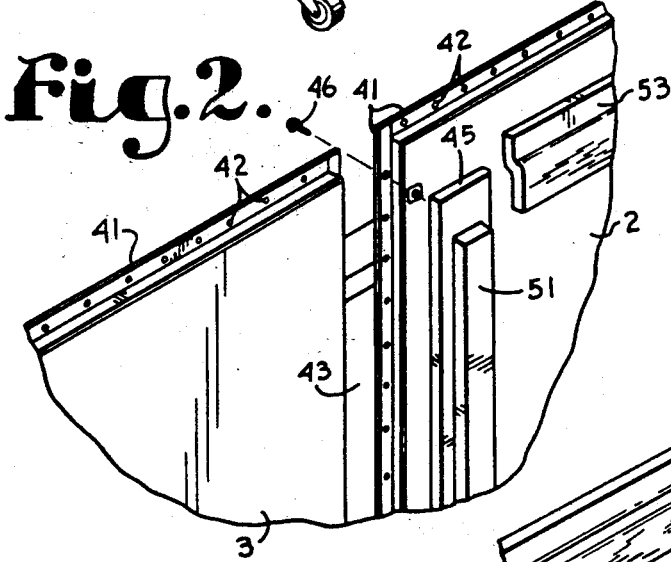
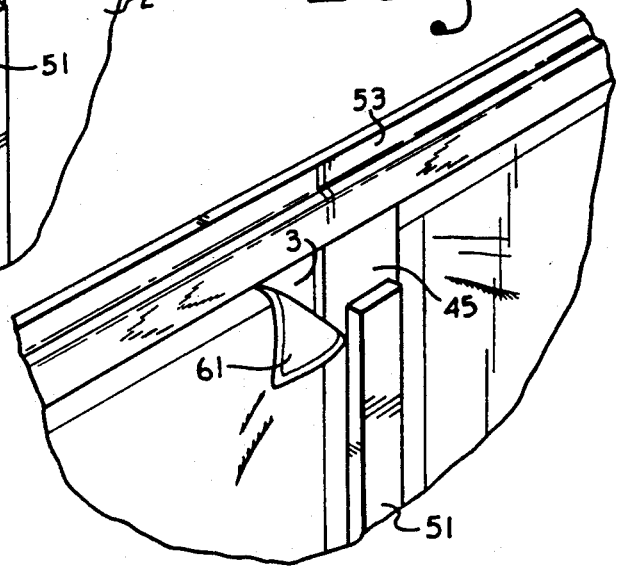

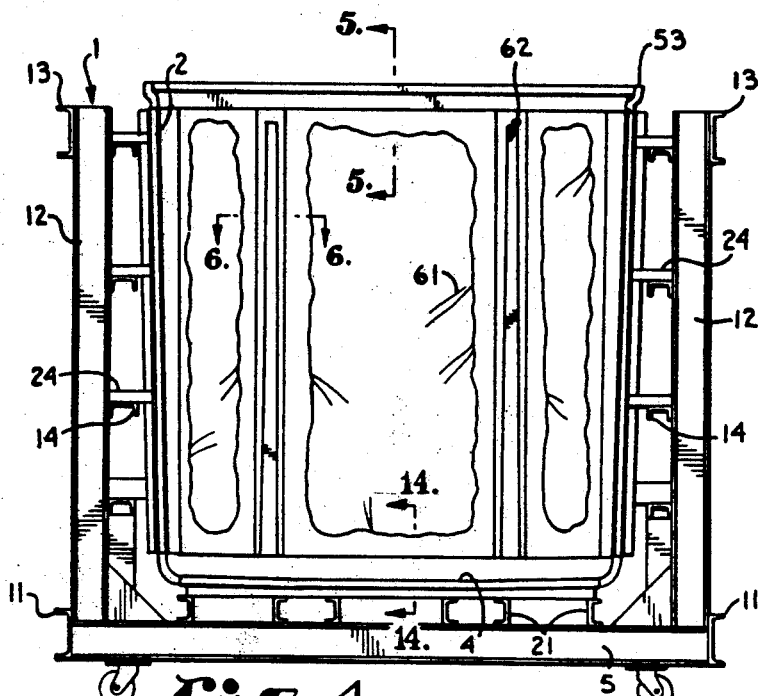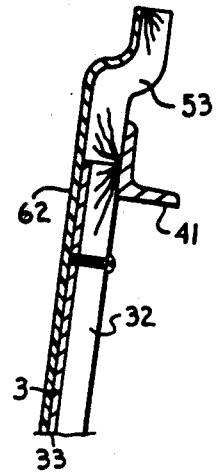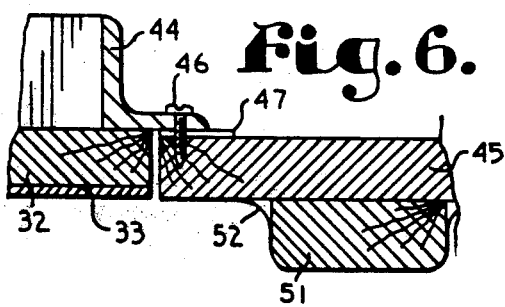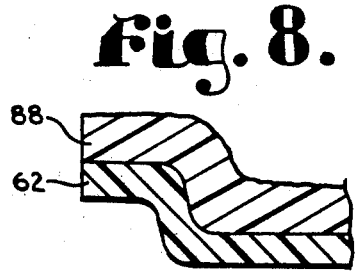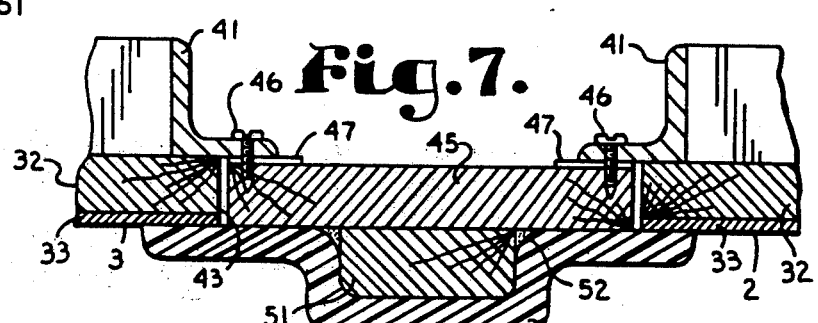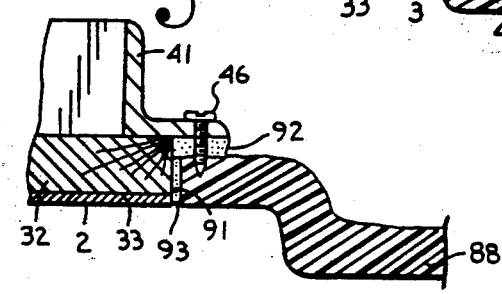

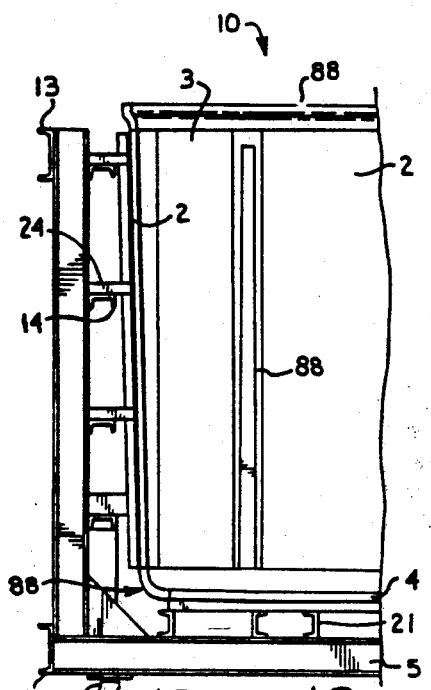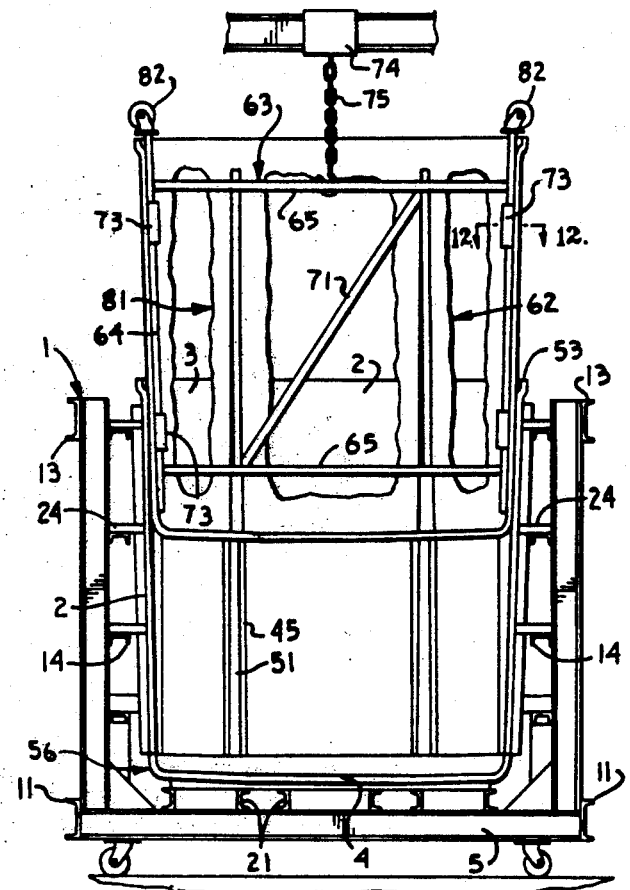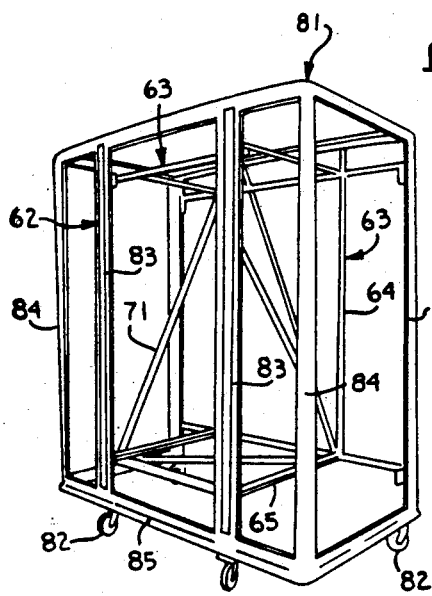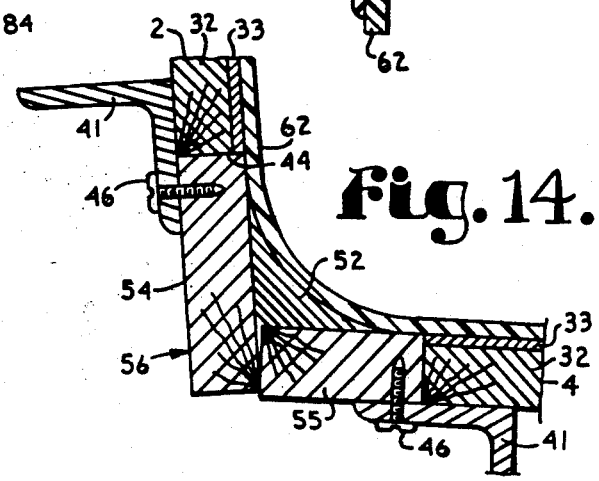

METHOD OF MAKING MOLDS

CROSS REFERENCED TO RELATED APPLICATIONS

The present application is a divisional application of U.S. Ser. No. 822,743 on SHELTER MOLD AND METHOD OF MAKING MOLDS, filed Jan. 21, 1992, now U.S. Pat. No. 5,221,505.

BACKGROUND OF THE INVENTION

The present invention relates to an improved mold and a method of making molds for large scale equipment shelters or the like.

In locations which are subject to extreme environmental conditions such as the north slope of Alaska or the equatorial tropics, it is common for delicate electrical and electronic equipment to be housed within protective shelters. Such equipment can include electrical and telephone switching panels, circuit breakers, and electronic controls for pipelines, aircraft guidance equipment at airports, etc. The shelters must be constructed to withstand physical shocks as well as exposure to extreme temperature and moisture conditions. It is known to construct such shelters from unitary inner and outer shells of impermeable polymeric material which are bonded together by a layer of rigid polymeric foam sandwiched therebetween. Normally, the inner and outer shells are separately molded, the inner shell is then inserted into the outer shell, and the polymeric foam is injected between the shells and allowed to harden. The resultant structure has excellent structural strength and insulating qualities.

Separate molds are required for both the inner and the outer shells, and the shells are normally constructed by laying up or spraying a glass reinforced plastic, such as Fiberglas or the like, or other composite material on the mold which is then allowed to set and is removed to form the finished shell. In the case of the outer shell, this requires a worker to apply the composite from within the mold, resulting in a cramped and dangerous condition since it is difficult to properly ventilate such a small space. Recognizing this problem, the present inventor has created a two-part mold for the outer shell so that, during molding, one end of each mold part is open. The outer shell halves molded therefrom are subsequently assembled into a unitary outer shell structure. This invention is shown and described in applicant's U.S. Pat. No. 4,156,998, patented on Jun. 5, 1979, which is incorporated herein by reference.

In creating the shell molds, including the two-part mold of the above-cited patent, it has been traditional to first create a full scale model or pattern of each shell to be molded. A laminate is applied onto the pattern and allowed to cure. The resultant shell is removed and constitutes the mold. The molds are generally supported by frameworks to avoid distortion of the walls of the mold from the weight of the applied laminate. This is particularly true during the injection and curing of the foam between the shells because of expansion forces generated during curing of the foam. This is the same technique used to construct molds for boats and other structures which comprise compound curved surfaces. While the technique works well for such compound curved structures, equipment shelters generally comprise a plurality of large rectangular flat surfaces. In creating a mold which comprises such large flat surfaces from a pattern, it is not unusual for the laminate to partially separate from the pattern surface prior to complete curing. This generally requires the entire process to be repeated. Furthermore, it is common for bubbles and other disturbances to occur even in a properly cured mold, producing deformities in the mold. The resultant defects in the molded product are particularly noticeable in the multitude of large flat surfaces which constitute a shelter. In addition, the construction of such full scale patterns themselves is an expensive and time consuming process.

A need exists for improved shelter shell molds and a method of producing such improved molds. The molds should be relatively deformity free, inexpensive and durable enough to last for production runs of considerable quantities of shelters. The method of making the molds should eliminate the need for expensive and time-consuming preparation of a full scale pattern of the shells to be molded, and should eliminate separation problems and other defects common in molding large flat walls.

SUMMARY OF THE INVENTION

The present invention is an improved shell mold and a method of making such a mold for use in molding relatively large equipment shelters or the like. The improved mold of the present invention is generally a built-up mold for large shell structures which is formed by rigid panels supported on a frame and having corner and rib mold components positioned in corner and rib gaps between the panels and connected to the adjacent panels.

The method of making a shell mold includes the steps of forming a generally rectangular main frame and attaching a plurality of large flat panels to the frame in the same spatial relationship as the flat walls of the shell to be molded. The panels can be made from plywood sheets to which are attached a thin sheet of stainless steel, for example. When the panels are attached to the frame, they are separated from each other by rib gaps between adjacent panels and corner gaps between panels at angles to one another. The rib and corner gaps are closed by non-flat rib and corner mold components which are fastened to the sides of the panels bordering the gap in which a mold component is located. The rib mold components are used to form strengthening ribs in the walls of the shell structure to be molded and to enhance the aesthetics of the structure.

The rib and corner mold components are preferably formed by molding same using the basic structure of the mold assembly of the present invention. Temporary mold patterns, having the contours which are desired in the shell produced in the mold assembly, are placed in the gaps and connected to angle members along the edges of the flat panels to form a completed initial positive mold on the main frame. The temporary rib and corner patterns are formed primarily of wood and sculpted putty. The panels are covered with paper, and the temporary patterns are sprayed with a release agent, as is well known in the art. A layer of reinforced plastic is laid-up or sprayed on the temporary patterns to form negative mold components. The plastic may be laminated with an additional reinforcement, such as a layer of balsa wood. The negative mold components interconnect to form a negative mold skeleton which, when cured, is removed from the mold assembly by attaching a skeleton frame thereto and lifting from the mold frame. The negative mold skeleton is trimmed of excess materials and is used as a mold for permanent mold components. On each negative mold component, a layer of reinforced plastic is applied and allowed to cure. The resulting final and permanent mold components are positive mold components and are removed from the negative mold skeleton and positioned in the rib and corner gaps in place of the temporary mold patterns to produce a complete positive mold assembly to produce molded shells.

Thus, a mold assembly is formed for a relative large shell structure which does not require a complete, full-sized integral pattern. The portions of the mold which are simply flat walls are constructed in place. Only connecting surfaces to the flat surfaces require the making of patterns; however since such patterns are small and relatively simple, they can be formed much more conveniently and economically than a full-sized pattern for the entire shell structure to be molded. The mold assembly and method of making same are equally adaptable for forming female molds to mold outside shells Or male molds to mold inside shells, which shells can then be joined with interspaced insulation.

OBJECTS AND ADVANTAGES OF THE INVENTION

The principal objects of the present invention are: to provide an improved mold assembly for molding shell portions of relatively large shelters from reinforced plastics and a method of making such a mold assembly; to provide such a mold assembly which avoids the necessity of constructing a full scale pattern of the shelter shell portions prior to construction of the mold; to provide such an assembly which is particularly adapted for molding structures having large flat surfaces; to provide such an assembly which allows a multitude of choices for the mold surfaces for the flat areas of the mold; to provide such a mold assembly including large flat rigid panels connected to a frame to form corresponding flat walls of the shelter shells and molded components connecting the panels to form corner and rib portions connecting the flat walls of the shell; to provide such a mold assembly in which permanent corner and rib mold components are formed on the assembly using temporary patterns positioned in the gaps between the rigid panels; to provide such a mold assembly which is adaptable either as a female mold to form external shells or a male mold to form internal shells; to provide such a mold assembly in which the external shells can be formed in sections to avoid the necessity of placing a worker within a confined space which is not well ventilated; to provide such a mold assembly including numerous large flat surfaces which are substantially free of defects for molding the shells; and to provide such a mold assembly which is economical to manufacture, which is durable in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a shell mold frame according to the present invention, to which are attached a plurality of flat panels with gaps therebetween.

FIG. 2 is an enlarged fragmentary perspective view of two of the panels on the mold frame, with a wooden temporary pattern inserted in a gap between the panels.

FIG. 3 is a view similar to FIG. 2 with the temporary pattern in place and a protective paper layer applied to the panel surfaces.

FIG. 4 is a front elevational view of the mold frame with a reinforced plastic laminate applied over the temporary patterns.

FIG. 5 is an enlarged fragmentary cross-sectional view of one of the panels taken along line 5—5 of FIG. 4 with a top, a floor transition pattern attached to a frame member which extends around the upper periphery of the panel. This view also illustrates a draft angle which has been exaggerated for purposes of illustration.

FIG. 6 is an enlarged fragmentary cross-sectional view of a temporary pattern installed in the gap between two of the panels, taken along line 6—6 of FIG. 4, and showing the pattern prior to the application of the reinforced plastic laminate thereto.

FIG. 7 is a view similar to FIG. 6 and illustrates the temporary pattern after the application of the reinforced plastic laminate thereto to form a corresponding negative mold component.

FIG. 8 is a cross sectional view illustrating the application of a reinforced plastic laminate to the negative mold component of FIG. 7 to form a permanent mold component.

FIG. 9 is a view similar to FIG. 6 and illustrates the permanent mold component installed in place of the temporary pattern in the gap between two of the panels.

FIG. 10 is a fragmentary front elevational view of the completed mold assembly with permanent mold components installed in rib and corner gaps between the panels of the mold frame.

FIG. 11 is a front elevational view of the negative mold skeleton, along with the skeleton framework, being hoisted out of the mold frame.

FIG. 12 is a greatly enlarged cross-sectional view of a pipe in the skeleton framework taken along line 12—12 of FIG. 11.

FIG. 13 is a perspective view at a reduced scale of the skeleton framework with all excess reinforced plastic trimmed away from the negative mold components.

FIG. 14 is a greatly enlarged fragmentary cross-sectional view of a corner gap between two of the panels in the mold frame, with a temporary corner pattern in place and a negative corner mold component molded thereon.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1 and 4, the reference numeral 1 indicates a generally rectangular mold frame with a plurality of larger flat wall panels 2, a plurality of smaller flat wall panels 3, and a roof panel 4 attached thereto. The frame 1 includes an exterior frame which includes a pair of longitudinal base frame members 5 which are connected to each other at the ends thereof by a pair of transverse base frame members 11. A vertical corner frame member 12 extends upward from each end of each of the longitudinal base frame members 5. The vertical corner frame members 12 are also connected to each other by the transverse base frame members 11 and by a corresponding pair of transverse upper frame members 13. A plurality of transverse inner frame supports 14 and a plurality of longitudinal inner frame supports 15 extend between the vertical corner frame members 12 while a plurality of transverse roof supports 21 extend between the longitudinal base frame members 5. It should be noted that a shell structure to be molded in the frame 1 is molded in an inverted orientation. A plurality of vertical inner frame members 23 are attached to the transverse inner frame supports 14 and to the longitudinal inner frame supports 15.

The larger flat wall panels 2 are attached to the vertical inner frame members 23 and to a plurality of short inner frame supports 24 while the smaller flat wall panels 3 are attached only to the longitudinal inner frame supports 15. The roof panel 4 is attached to the roof frame supports 21. The roof panel 4 is illustrated as a single flat panel; however, it may be formed by a level center panel and slightly pitched roof side panels (not shown) if it is desired to mold a structure with a pitched roof.

The panels 2-4 can be constructed, for example, of birch plywood panels 32 which are covered by thin sheets of stainless steel 33. The stainless steel sheets 33 can be as thin as 1/16" in thickness and can be attached to the plywood panels 32 by threading bolt holes (not shown) in the stainless steel sheets 33 and attaching the plywood panels 32 thereto via bolts 35 (FIG. 5). After threading, the ends of the bolts 35 are ground off to leave a smooth surface which is flush with the surface of the stainless steel sheets 33. A plurality of angle members 41 with predrilled holes 42 (FIG. 2) are attached to the entire periphery of the panels 2-4 via screws or the like which are inserted into the plywood panels 32. Structural members (not shown), such as angles, are preferably attached to the backs of the panels 2-4 to stiffen same and prevent warping thereof. The flat panels 2-4 are arranged to leave rib gaps 43 and corner gaps 44 thereamong.

Utilizing the mold frame 1 of FIG. 1 with the panels 2-4 attached thereto, a method of making a finished mold assembly 10 for molding shells for shelters will now be described with reference to FIGS. 2-14.

Referring to FIGS. 2 and 3, the rib gaps 43 are closed by attaching temporary rib patterns 45 to the angles 41 on each of the adjacent panels 2 and 3 via screws 46. The temporary rib patterns 45 can be constructed of wood boards, for example, and can include a raised wood portion 51 attached thereto. The effect of the raised portions 51 is to create a decorative pattern in the final mold assembly 10 and to form a stiffening rib in the shell to be molded. The temporary rib patterns 45 are given a desired contour by applying a radius external corners, as by use of a shaper/router and filleting internal corners by the use of wood fillets 52 or the like as shown in FIG. 6. The temporary rib patterns 45 are connected by the screws 46 to the angles 41 and may require shims 47 to properly position outer surfaces of the patterns 45 relative to the surfaces of the stainless steel sheets 33.

Temporary floor transition patterns 53 are attached to the tops of the panels 2 and 3 by screwing it to the angle 41, as illustrated in cross-section in FIG. 5. The pattern 53 creates a stiffening rib in the finished mold and, correspondingly, in the molded shells and provides for the attachment of a floor (not shown) to the shelter formed by the shell. Note that the top of the mold frame 1 corresponds to the bottom of the molded shell.

The corner gaps 44 are closed as shown in FIG. 14. A pair of corner boards 54 and 55, arranged at an angle to each other, are attached to the angles 41 of the panels 2 and 4, respectively, via screws 46. The board 54 is wider than the board 55 and consequently overlaps it. The resultant sharp corner between the boards 54 and 55 can then be filled with a sculpted wood fillet 52 or the like to present a smoothly curved surface in a temporary corner pattern assembly 56. While the corner gap 44 between the wall panel 2 and the roof panel 4 has been illustrated, it should be noted that the corner gaps between the wall panels 3 and the roof panel 4 and the corner gaps between the wall panels 2 and 3 are closed in the same manner.

Once the temporary rib patterns 45, floor transition patterns 53, and the corner patterns 56 are attached to the panels 2-4, a protective paper covering 61 is adhered to the stainless steel surface of the panels 2-4, as shown in FIG. 3. A wax coating is applied to the patterns 45, 53, and 56, and a PVC (polyvinyl chloride) release solution is sprayed over the wax and the protective paper 61, as is well known in the art. A laminate comprising, for example, a layer of glass reinforced plastic, a thin balsa wood layer, and a second glass reinforced plastic layer is applied to surfaces of the temporary patterns 45, 53, and 56, and allowed to cure. The cured laminate results in negative mold components 62, as shown in FIGS. 4, 5, 7, and 9, which can be, for example, approximately ¼" to ⅜" thick. The mold components 62 are referred to as negative mold components because they have the same contour as portions of the shell to be molded, rather than a reversed contour which is necessary to mold the desired shell contours.

When the negative mold components 62 are completely cured, they form what is referred to as a negative mold skeleton 81 since there are spaces between the components 62 thereof. A skeleton framework 63 is built in place within the mold frame 1 to maintain the shape of the skeleton 81. The skeleton framework 63 is formed by four pipes 64 which are connected together by rigid cross members 65 and diagonal braces 71. The pipes 64 are connected to the mold skeleton 81 by applying wetted reinforced plastic patches 73 around the pipes 64 and onto selected negative mold components 62. A cross section of one such patch 73 is illustrated in FIG. 12. When the patches 73 have cured, the negative mold skeleton 81, can be lifted out of the mold frame 1 either manually or by use of a hoist 74 and a chain 75 connected thereto, as shown in FIG. 11. The skeleton 81, with the excess reinforced plastic trimmed away, is illustrated in FIG. 13. Note that the skeleton framework 63 can be equipped with casters 82 for ease in transporting the skeleton 81 once it is removed from the mold frame 1. While the mold frame 1 has been described as being generally rectangular, the panels 2 and 3 are actually slanted inward slightly from the top of the frame 1 to the roof. A draft angle of approximately 1 degree from the vertical is sufficient to facilitate withdrawal of the negative mold skeleton 81, and eventually, the molded shell as well from the mold assembly 10.

The skeleton 81 is formed by negative rib mold components 83 which correspond to the temporary rib patterns 45, negative corner mold components 84 which correspond to the corner patterns 56, and negative floor transition mold components 85 (FIG. 13) which correspond to the floor transition patterns 53.

Referring to FIG. 8, the negative mold Components 62 are used as molds to form permanent mold components 88 by applying one or more layers of reinforced plastic to each and curing same. If necessary, the permanent mold components 88 can be further reinforced by laminating with balsa strips (not shown) or other materials. Permanent mold components 88, corresponding to the temporary rib patterns 45, floor transition patterns 53, and corner patterns 56 are inserted into the rib gaps 43, corner gaps 44, and at the tops of the panels 2-4 in place of the patterns 45, 53, and 56 which have been removed. Note that the permanent mold components 88 have been trimmed to leave a small gap 91 between them and each of the panels 2-4. The permanent mold components 88 may be formed as a permanent mold skeleton (not shown) and, after trimming excess material, placed in the mold frame 1 as a unit or separated into several subunits to facilitate placement of the permanent mold components 88 into the frame 1. A hardening compound or putty 92 is placed behind the permanent mold components 88 to position them flush with the front surface of the stainless steel sheets 33 On the panels 2-4, and the permanent mold components 88 are attached to angles 41 of the panels 2-4 via the screws 46. The gap 91 may be filled with the silicone material 93 or the like for fit and to permit thermal expansion and contraction of the mold parts.

The permanent mold components 88 installed with the panels 2-4 on the frame 1 complete the shell mold assembly 10 of the present invention. The resulting shell mold 10 is relatively deformity free since the large flat portions of the mold 10 are formed by the stainless steel surfaces of the panels 2-4, with only the rib, corner and floor transition components 88 constructed of reinforced plastic. The mold 10 is relatively inexpensive to construct and is durable enough to last for production runs of considerable quantities of shelters. The method of making the mold 10 eliminates the necessity for the expensive and time-consuming preparation of a full scale pattern of the shelter shell to be molded, and eliminates the separation problems and other defects common in laying up large flat mold surfaces with reinforced plastic laminates.

While the panels 2-4 have been described as plywood panels 32 covered with stainless steel sheets 33, alternative materials would work equally well. For example, the panels may be plywood panels covered with Formica or the like, or even reinforced plastic laminates. Furthermore, while the negative mold components 62 and the permanent mold components 88 have been described as reinforced plastic, it should be clear that other composite materials, durable polymers, or other materials can be used as well.

The illustrated mold assembly 10 is particularly intended as a female mold for molding at least a portion of a outer shell of a two-shell shelter, the inside shell mold being prepared in a similar fashion. In the case of a male mold for molding an inside shell, flat panels similar to the panels 2 and 3 would be attached to the outside of such a mold frame, with a ceiling panel or panels attached to the top of the mold frame. Non-flat mold components, analogous to the permanent mold components 88 would be formed in a manner similar to the components 88 and assembled on the male mold in a similar manner. All other steps are substantially the same as for constructing the mold assembly 10.

In particular, the complete mold assembly 10, or simply the mold frame 1 with the panels 2-4 attached, can be used as a jig to construct a male mold (not shown). For this purpose, spacer strips, formed of boards ripped to the desired spacing with allowances for the thicknesses of the inner and outer shells, can be temporarily attached across the panels 2-4, such as by hot-melt gluing. Flat male mold panels, similar to the panels 2-4, are positioned against the spacer strips; and a male mold panel support frame is built within the male mold panels and attached thereto. The male mold frame with panels attached can then be lifted out of the female mold frame 1, and a male mold assembly is then completed in a manner similar to the completion of the female mold assembly 10. Construction of a male mold in this manner results in a more uniform fit between walls of the outer shell molded in the female mold assembly 10 and an inner shell molded on the male mold.

A foaming jig (not shown) can also be constructed within the female mold in a manner similar to the male mold, although the foaming jig does not require the use of mold members to close gaps between panels thereof. The foaming jig is supported within the inner shell during the injection of foam between the inner and outer shells to support the walls of the inner shell against pressures generated by expansion of the resin materials constituting the polymeric foam.

Shelters molded from the molds of the present invention can be fairly large, e.g., on the order of 10' by 25'. In molding such a large shelter, the mold frame 1 could be sized for molding, for example, a 4' by 10' section of the shelter, with the remaining sections molded in one or two pieces with other mold frames and then assembled as taught by the above-cited U.S. Pat. No. 4,156,998.

It is to be understood that while certain forms of the present invention have been illustrated and described herein, it is not to be limited to the specific forms or arrangement of parts described and shown.

What is claimed and desired to be secured by Letters Patent is as follows:

1. A method for forming a mold assembly for molding a wall structure including a plurality of flat walls positioned in a spaced relation and connected by non-flat walls having respective contours, said method comprising the steps of:
   (a) constructing a rigid frame;
   (b) attaching a plurality of substantially rigid panels to said frame, each panel having a flat surface, said panels corresponding respectively to said flat walls, being positioned on said frame in said spaced relation, and having interim gaps thereamong corresponding respectively to said non-flat walls;
   (c) positioning a temporary mold pattern in each of said gaps, said temporary pattern having the same contour as a non-flat wall corresponding to said gap;
   (d) forming a negative mold component corresponding to each of the temporary patterns using said temporary patterns;

(e) removing the negative mold components from said temporary patterns and removing said temporary patterns from said gaps;

(f) forming a permanent mold component corresponding to each of said negative mold components using said negative mold components; and (g) positioning the permanent mold components respectively in said gaps to complete said mold assembly.

2. A method as set forth in claim 1 wherein said forming a negative mold component step is performed by the steps of:

(a) applying a layer of a reinforced plastic to a corresponding temporary mold pattern; and (b) curing said layer of reinforced plastic to form said negative mold component.

3. A method as set forth in claim 1 wherein said forming a negative mold component step is performed by the steps of:

(a) applying a layer of a reinforced plastic to each temporary mold pattern in such a manner that at least a plurality of the layers of reinforced plastic are interconnected to form a negative mold component skeleton;

(b) curing said layers of reinforced plastic of said skeleton;

(c) connecting a skeleton frame to said skeleton; and (d) separating said skeleton from the corresponding temporary mold patterns by lifting said skeleton frame.

4. A method as set forth in claim 1 wherein said forming said permanent mold component step is performed by the steps of:

(a) applying a layer of a reinforced plastic to a corresponding negative mold component;

(b) curing said layer of reinforced plastic to form said permanent mold component; and (c) separating said permanent mold component from said negative mold component.

* * * * *